United States Patent [19]

Wood et al.

[11] 4,154,498
[45] May 15, 1979

[54] REMOVABLE ELECTRICAL CONNECTOR

[75] Inventors: Theodore H. Wood, Brewster; Robert D. Leighton, Brockton, both of Mass.

[73] Assignee: Alden Research Foundation, Westboro, Mass.

[21] Appl. No.: 847,164

[22] Filed: Oct. 31, 1977

[51] Int. Cl.² ............................ G12B 9/08; H02B 1/04
[52] U.S. Cl. ..................................... 339/128; 248/27.3
[58] Field of Search ............................ 339/128, 126 R; 248/27.3

[56] References Cited

U.S. PATENT DOCUMENTS

| | | | |
|---|---|---|---|
| 3,079,581 | 2/1963 | Klumpp | 248/27.3 X |
| 3,596,233 | 7/1971 | De Vito | 339/128 |
| 3,950,066 | 4/1976 | Bienwald | 339/128 |
| 4,080,522 | 3/1978 | Schimmels | 339/128 X |

FOREIGN PATENT DOCUMENTS 1269091  3/1972  United Kingdom ................... 248/27.3

Primary Examiner—Roy Lake
Assistant Examiner—E. F. Desmond
Attorney, Agent, or Firm—James H. Grover

[57] ABSTRACT

An electrical connector which can be mounted on a panel. The connector includes a self contained locking mechanism with a pair of integrally molded resilient arms that are spaced from the body of the connector by hinges and which are designed to oppose a shoulder disposed around the perimeter of the face of the connector and to grip the panel for a secure fit.

4 Claims, 7 Drawing Figures

REMOVABLE ELECTRICAL CONNECTOR

BACKGROUND OF THE INVENTION

This invention relates to electrical connectors and especially to those which are to be locked in a panel.

DISCUSSION OF THE PRIOR ART

In the past, one method of attaching such connectors has been to secure them to the face of the panel with screws. Such attachment required two holes to be formed in the panel in addition to the aperture for the connector. Another approach has been to secure a spring-like metal retainer around the body of the connector after it had been inserted into the aperture. Yet another approach has been to screw a U-shaped metal clip to the base and dispose the ends of the clips against the panel. All of these approaches required a substantial amount of labor to install and supplementary hardware has to be packed and assembled.

STATEMENT OF THE INVENTION

According to the present invention, I have devised a molded grounded female connector which can be easily inserted and removed from a panel without the use of hardware or tools. When seated, the connector is rigidly held and cannot be removed accidentally even when disconnecting plugs with a high withdrawal force. The connector includes a body which has a face at one end that can be seen from the front of the panel. A shoulder extends from the face and provides support which holds the connector firmly in place on the panel when used in conjunction with a pair of resilient arms that are integrally molded to the body through hinges that extend towards the shoulder. Ramps are disposed on the exterior side of each of the arms with the lowest portion furthest from the shoulder.

The highest portion of the ramp ends beneath the shoulder and provides a sufficient space to secure the body to the panel. The arms are constrained in their outward movement by stops which are disposed at their ends and held underneath the shoulder.

DRAWINGS

DESCRIPTION

Figure 1:
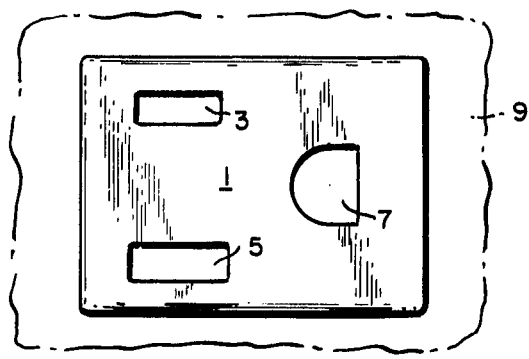
FIG. 1 is a plan view of an electrical connector which can be secured with the locking device of the present invention. The panel in which the connector is supported is shown in phantom lines.

A female connector having a face 1 is shown in FIG. 1. Two rectangular apertures 3 and 5 and one grounding aperture 7 are disposed in the face of the connector so that a three-pronged male plug can be inserted. The perimeter of the face 1 is larger than the aperture into which the connector is inserted thereby providing a shoulder which rests upon the front of panel 9.

Figure 2:
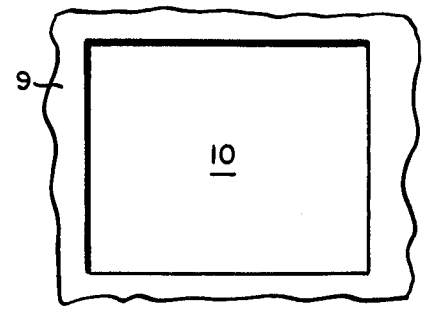
FIG. 2 is a view of the panel with an aperture cut out and suitable for reception of an electrical connector.

The shape of the aperture 10 in panel 9, as shown in FIG. 2, generally corresponds to the external dimensions of the body of the electrical connector, which in this case is generally rectangular. The shoulder of the electrical connector will rest upon the perimeter of the aperture 10 to provide support for the device.

Figure 3:
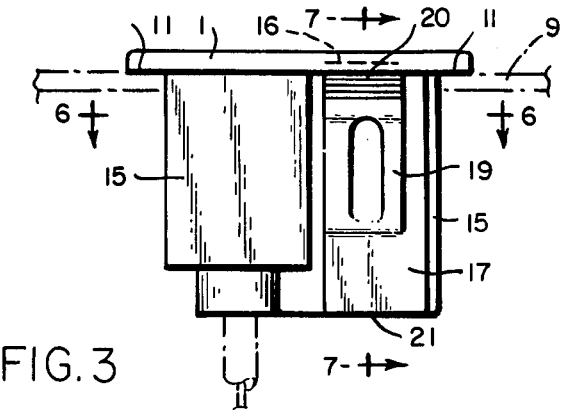
FIG. 3 is an elevational view of one side of an electrical connector utilizing the locking device of the present invention.

As shown in FIG. 3, the face 1 of the connector extends beyond the body 15 and forms the shoulder 11. Arms 17 (one of which is shown in this figure) are integrally attached to the lower portion of the body 15 by means of hinges 21 and extend towards the shoulder 11. A ramp 19 is integrally disposed upon the arm 17, with its lowest portion nearest to the hinge 21 and its highest portion nearest the shoulder 11. A series of steps 20 are disposed at the end of the ramp 19, that is adjacent to the highest portion. These steps lead downwardly to the arm 17 and end in a stop 16 (shown in Phantom lines) that is disposed in a recess within shoulder 11.

Figure 4:
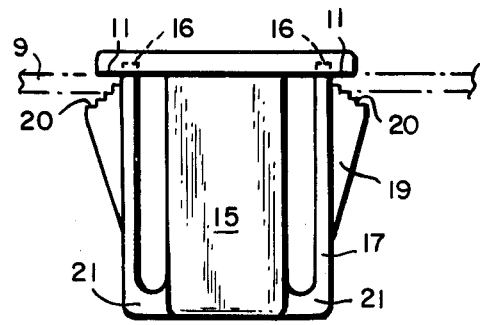
FIG. 4 is an elevational view of another side of the electrical connector shown in FIG. 3.

FIG. 4 illustrates both of the arms 17 being integrally molded through hinges 21 to the lower portion of the body 15. Hinges 21 provide spacings for arms 17 from body 15, which are sufficient to enable the body 15 and ramps 19 to be drawn through the aperture in the panel. While the connector is being inserted into the aperture, the arms 17 will be squeezed in and because of their inherent resiliency, they will urge ramps 19 against the edge of the aperture. When the top of the ramp is reached, the arms 17 will swing back and urge steps 20 against the edge until the shoulder butts against the face of the panel 9, at which point a step will engage the rear of the panel and lock the connector in place.

Figure 5:
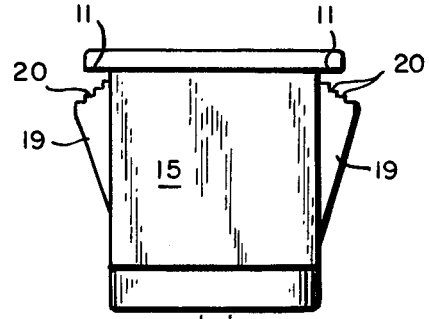
FIG. 5 is an electrical view of a third side of the electrical connector shown in FIGS. 3 and 4.

A third side of the connector is shown in FIG. 5. Shoulder 11 extends around all sides of the connector to provide support for the device and as previously described, ramps 19 with steps 20 leading therefrom are disposed on the opposite sides of the body 15 to provide a detachable support for the connector.

Figure 6:
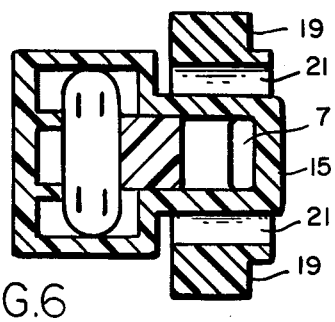
FIG. 6 is a cross-sectional view taken along the lines 6—6 of FIG. 3.

The cross-sectional view of FIG. 6 illustrates the top of the ramped surface 19 which is attached to the body 15 of the connector by the hinges 21. Body 15 is reduced in width about the ground wire receptacle 7 and the balance of the body 15 is of adequate width to house the female connections of the unit.

Quite advantageously, the arms 17 are not located at the center line of the body 15 of the connector, but rather are offset and disposed about either side of the grounding receptor 7. The grounding receptor 7 has only one aperture which is located on one center line of the body 15, but is disposed to the side of the orthagonal center line of body 15 and the width of the body 15 about grounding receptor 7 is reduced. Hinges 21 are disosed within the recesses formed by the reduction in width of body 15 thereby allowing the connector to be placed into a rectangular panel aperture. Arms 17 extend towards shoulder 11 from the bottom of both sides in a spaced relationship therewith and therefore are fairly long and can be urged in easily when the connector is inserted into the panel. The space between arms 17 and the body 15 is sufficient to enable ramps 19 to pass through the aperture 10 in the panel 9 when the arms are squeezed.

Figure 7:
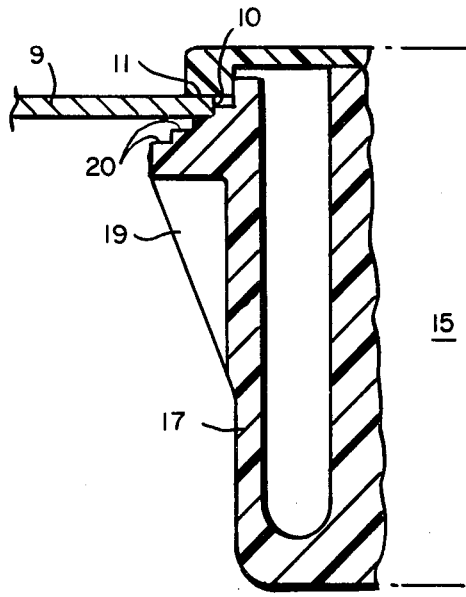
FIG. 7 is a cross-sectional view taken along the lines 7—7 of FIG. 3.

Referring now to the cross-sectional view of FIG. 7, it will be seen that the shoulder 11 ends in a flange 12 which is designed to rest on the panel 9. As described with reference to previous figures, arms 17 are hinged to the lower portion of the body 15 and when not engaging a panel, they are normally biased towards the flange 12 and the stops 16 rest thereagainst. As previously mentioned, the space between arm 17 and body 15 is sufficient to enable the connector to be inserted through the aperture in the panel and pass the ramp 19 at its highest point. After the connector has been forced past the highest point of ramp 19, the arms 17 will swing out and the steps 20 will engage the edges of the panel 9. Quite advantageously, the present connector will accommodate a wide variety of panel thicknesses. If the panel is thin, one of the lower steps will engage the edge as shown on the left side of this figure while with thicker panels, an upper step will engage it as shown on the right.

To install the connector, the lead-in wires are attached through the aperture on the panel to a power supply. The lower portion of the body 15 is then inserted into the aperture which causes the arms 17 to be forced inwardly. When the panel reaches the top of the ramp, it slips over onto the series of steps 16. The arms 17 are normally biased outwardly from the body 15 and will cause the steps 16 to lock against the edges of the rear of the aperture and hold the shoulder against the front of the panel. To remove the connector, one merely squeezes the arms, preferably near the ramps, and the connector can be easily withdrawn.

To assemble the connector, lead-in wires are threaded through apertures disposed in the base of the body 15 and secured to electrical contacts. The arms 17 are urged inwardly with the stops 16 within flange 12 and the rear of face 1 is then welded to the body 15. When the pressure is removed from arms 17, they will swing out and stops 16 will butt against the flange 12 on the inside of the shoulder 11.

It is apparent that modifications and changes can be made within the spirit and scope of the present invention. For example, although an AC connector is shown, the body could easily house an indicator lamp or a switch.

We claim:

1. An electrical connector comprising:
   a body and means forming three female electrical contacts disposed in the face of said body, two of said means being disposed on a line and the third of said means being offset from the other two means, the width of said body on both sides of the third means being reduced to form recesses;
   a shoulder disposed around the face of said body, said shoulder being peripherally larger than said body and containing an internal cavity with sidewalls;
   a pair of resilient outwardly biased arms hinged and integrally molded to the other end of said body and disposed on each side of said third means, each of the arms being disposed in one of said recesses, said arms each being spaced from said body and terminating in stops, said stops being arranged to moveably fit within said cavity, the distance between the external surfaces of said arms being substantially the same as the width of the body on said line;
   a ramp disposed on each of said arms, the portion of the ramp with the least height being furthest from said shoulder and adapted to squeeze said arms inwardly into said recesses upon insertion of said connector into a panel.

2. The device according to claim 1 wherein steps are disposed at the ends of each of the ramps, said steps leading from the tops of the ramps to said stops.

3. A locking device for securing a member into an aperture in a panel, said device comprising:
   a body having a face and a shoulder extending outwardly from one end of said body, said shoulder being peripherally larger than said body;
   a pair of resilient, outwardly biased arms integrally hinged and molded to the other end of said body, each of said arms extending towards said shoulder and spaced from said body;
   a ramp disposed on the outer surface of each of said arms, the portion of the ramp with the least height being furthest from said shoulder;
   a series of steps disposed at the top of each of said ramps, said steps adapted to engage the edges of the aperture in the panel;
   the face of said body containing three apertures, two of which are adapted to receive male electrical connectors and the third of which is adapted to receive a ground connector, the ground connector aperture being disposed on one center line of the body but offset from an orthogonal center line of said body, the width of the body near the ground connector aperture being less than the width near the male connector apertures;
   said arms being disposed on either side of the ground connector aperture and within the portion of lesser width, the distance between the external surfaces of said arms being substantially the same as the width of the body adjacent the two male connector apertures.

4. An electrical connector comprising:
   a body and means forming three female electrical contacts disposed in the face of said body, two of said means being disposed on a line and the third of said means being offset from the other two means, the width of said body on both sides of the third means being reduced to form recesses;
   a shoulder disposed around the face at one end of said body, said shoulder being peripherally larger than said body;
   a pair of resilient outwardly biased arms hinged and integrally molded to the other end of said body and disposed on each side of said third means, each of the arms being disposed in one of said recesses, the distance between the external surfaces of said arms being substantially the same as the width of the body on said line;
   a ramp disposed on each of said arms, the portion of the ramp with the height being furthest from said shoulder and adapted to squeeze said arms inwardly into said recesses upon insertion of said connector into a panel.

* * * * *